Figure 1:
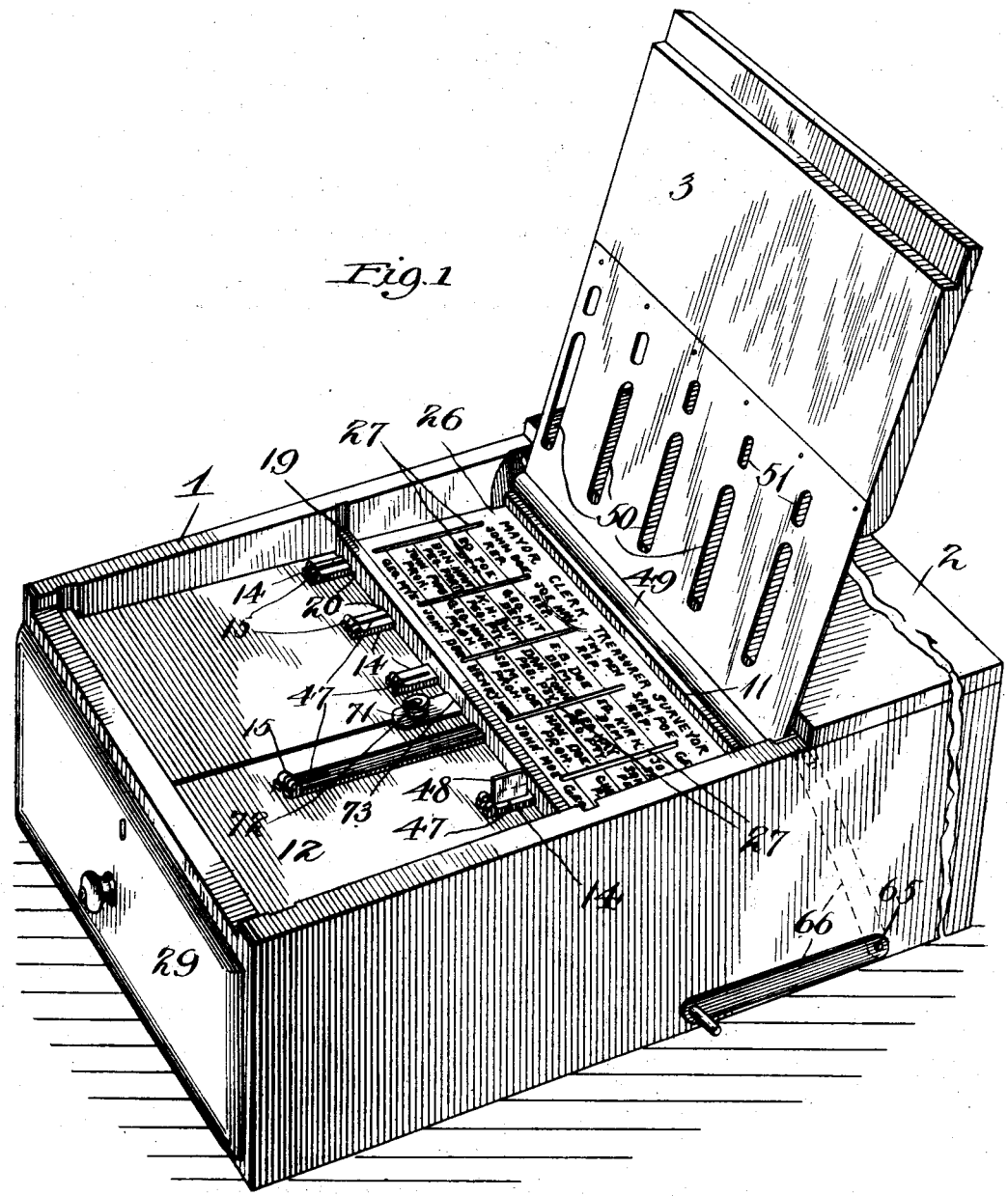

No. 684,395. Patented Oct. 8, 1901.
J. BLOCHER.
VOTING MACHINE.
(Application filed July 13, 1900.)
(No Model.) 8 Sheets—Sheet 1.

Witnesses:
W. C. Corlies
Wm. Geiger

Inventor
John Blocher,
by Walter N. Haskell.
Atty

No. 684,395. Patented Oct. 8, 1901.
J. BLOCHER.
VOTING MACHINE.
(Application filed July 13, 1900.)
(No Model.) 8 Sheets—Sheet 2.
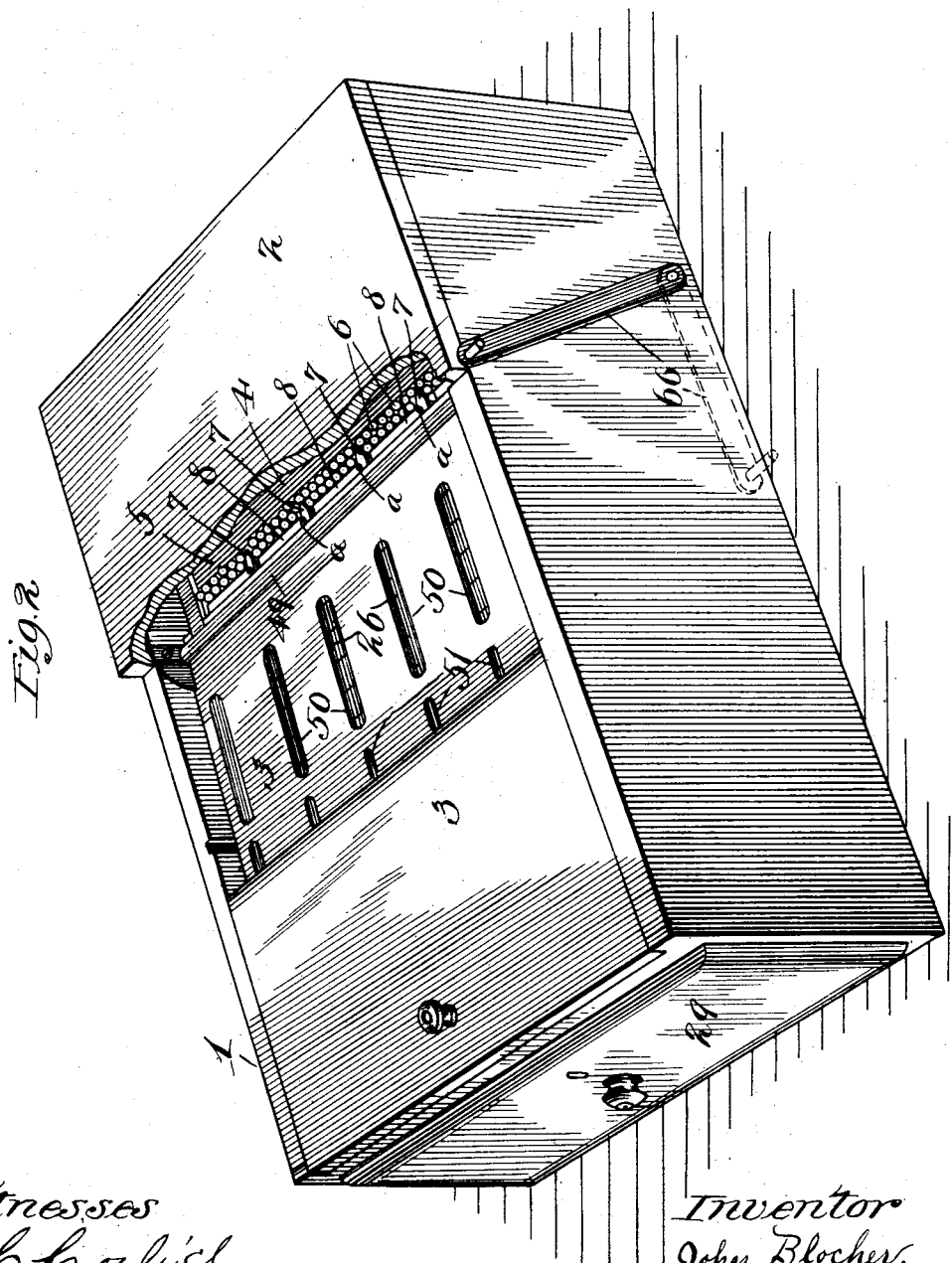

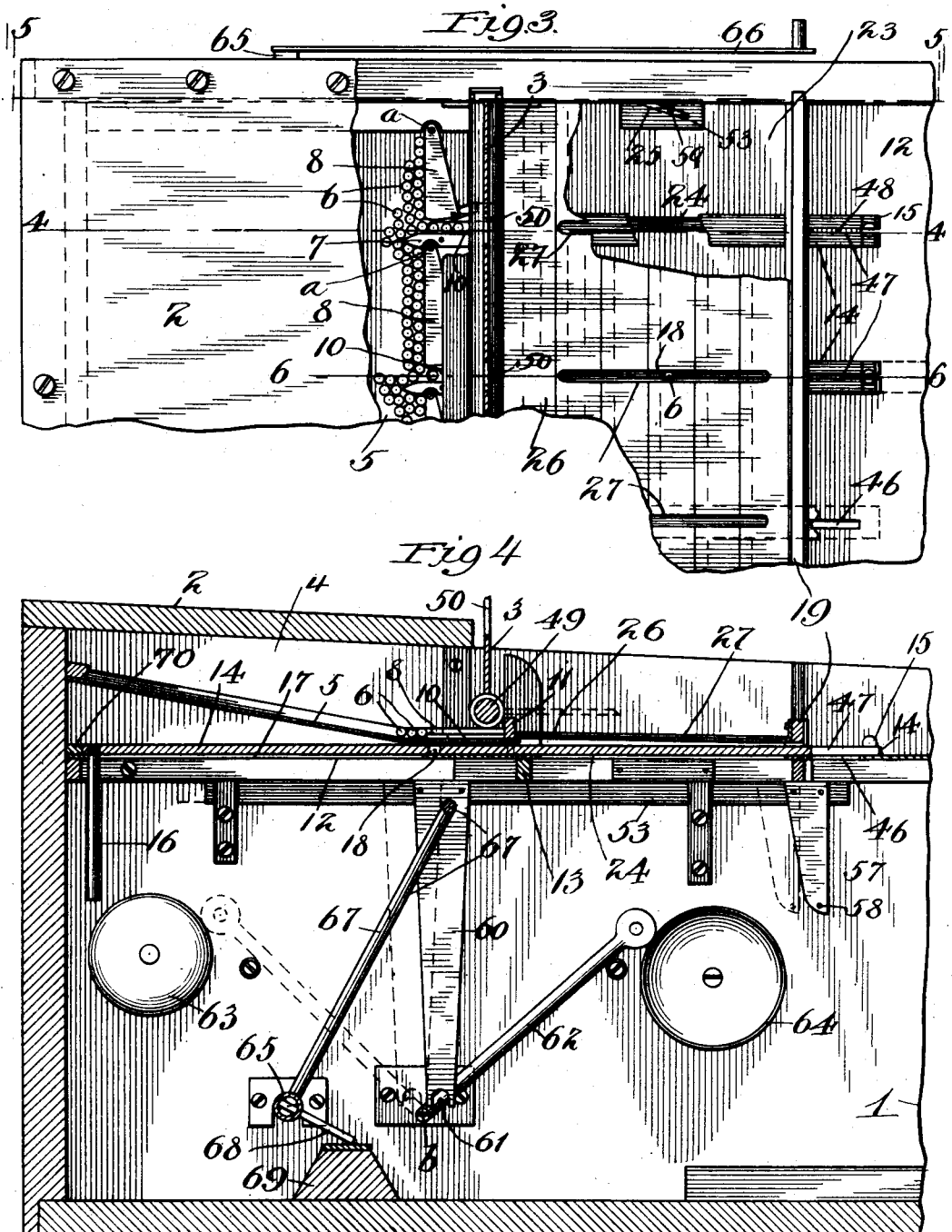

No. 684,395. Patented Oct. 8, 1901.
J. BLOCHER.
VOTING MACHINE.
(Application filed July 13, 1900.)
(No Model.) 8 Sheets—Sheet 4.
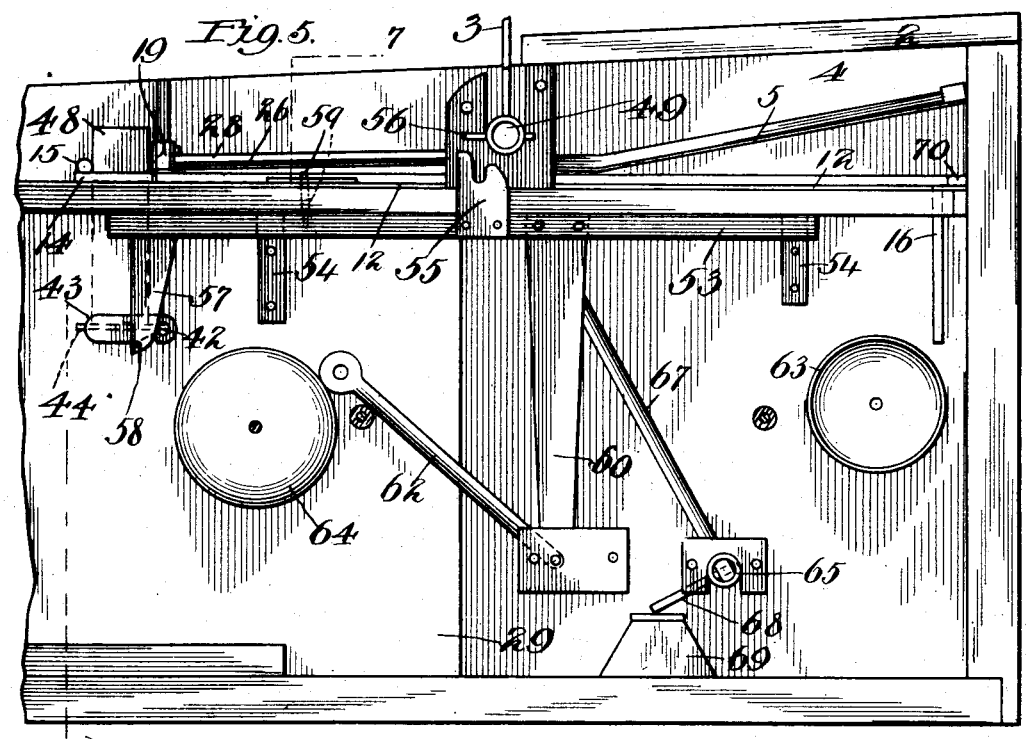
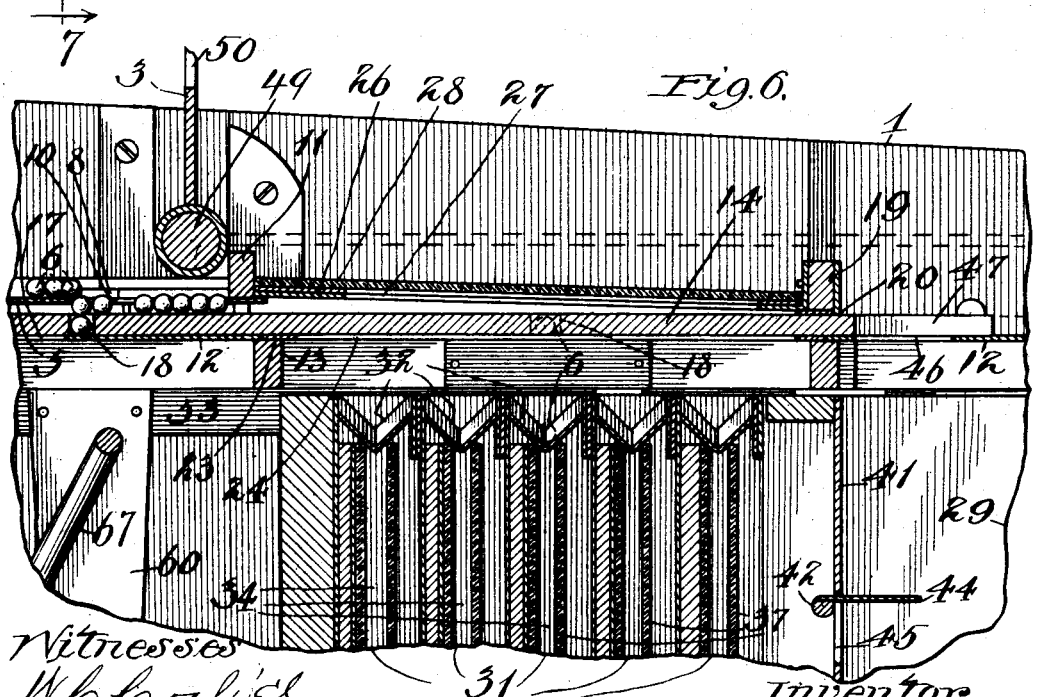
Witnesses
W. C. Coolies
Wm. Geiger
Inventor
John Blocher,
by Walter N. Haskell Atty No. 684,395. Patented Oct. 8, 1901.
J. BLOCHER.
VOTING MACHINE.
(Application filed July 13, 1900.)
(No Model.) 8 Sheets—Sheet 5.
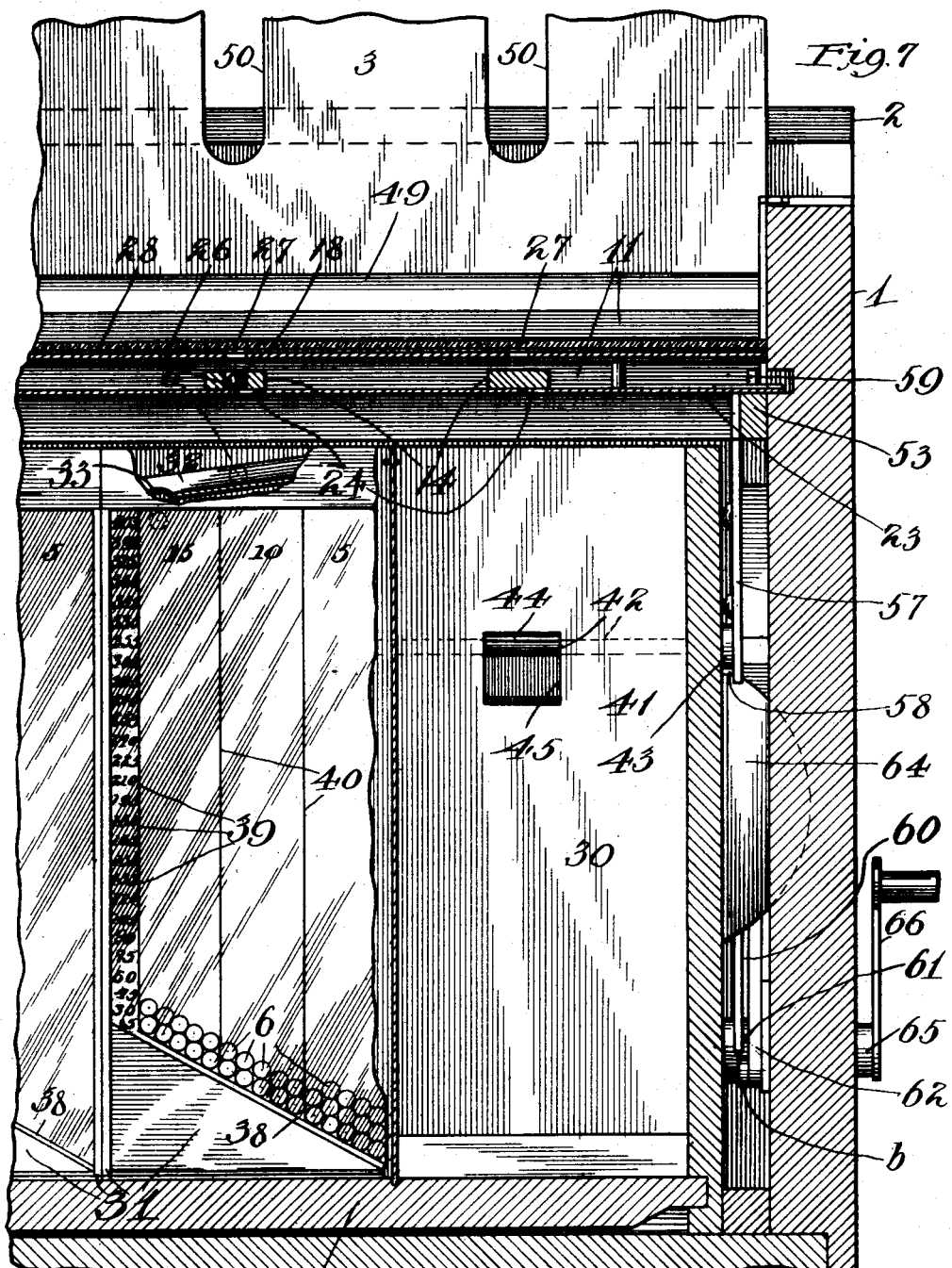

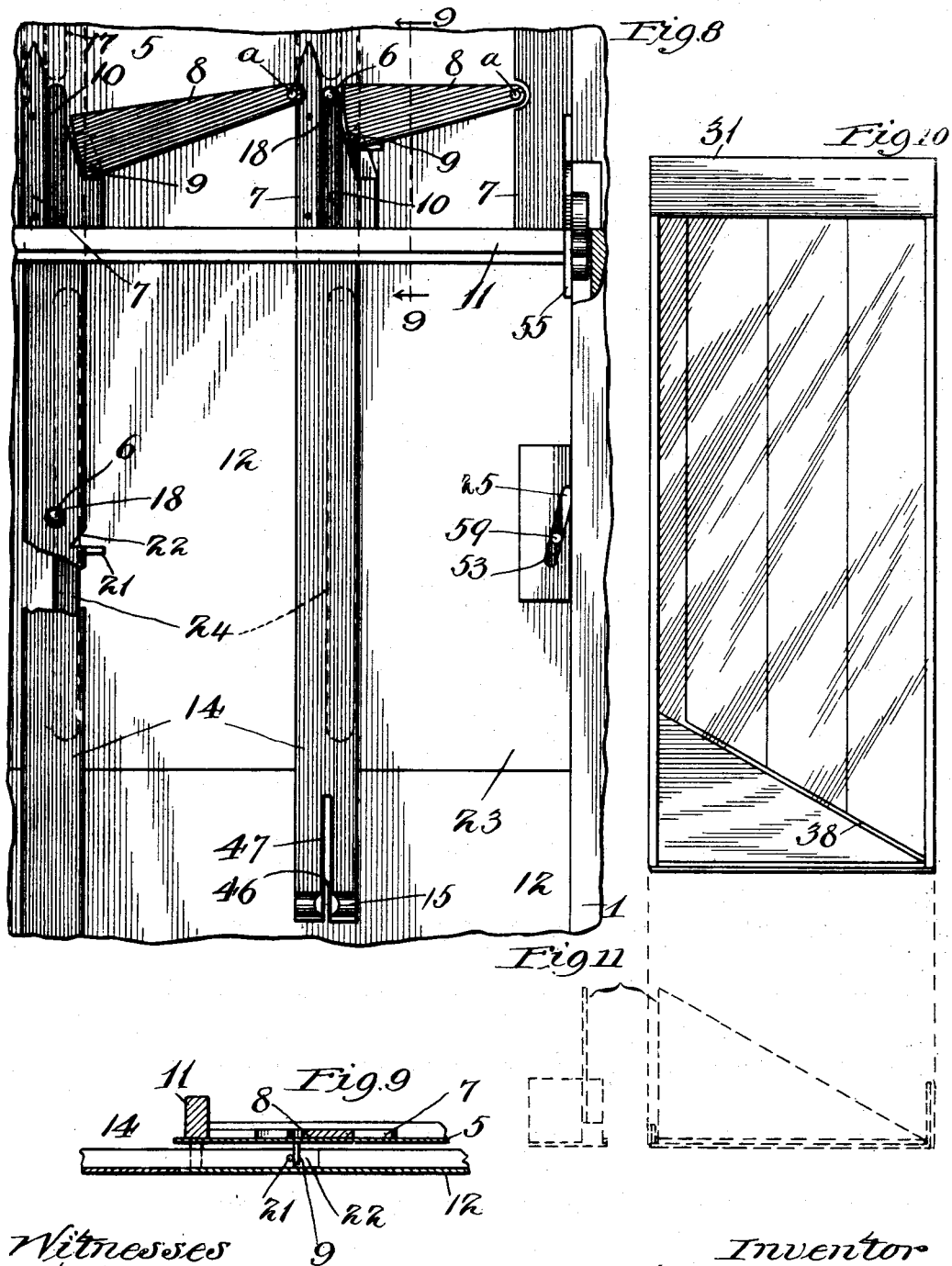

No. 684,395. Patented Oct. 8, 1901.
J. BLOCHER.
VOTING MACHINE.
(Application filed July 13, 1900.)
(No Model.) 8 Sheets—Sheet 7.
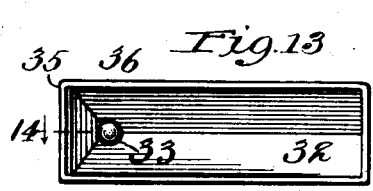
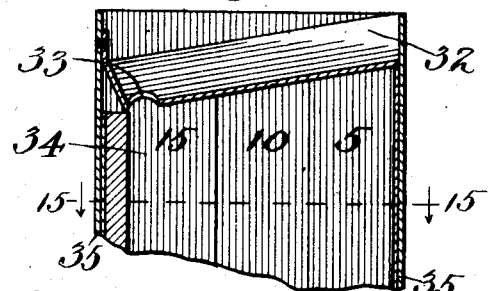
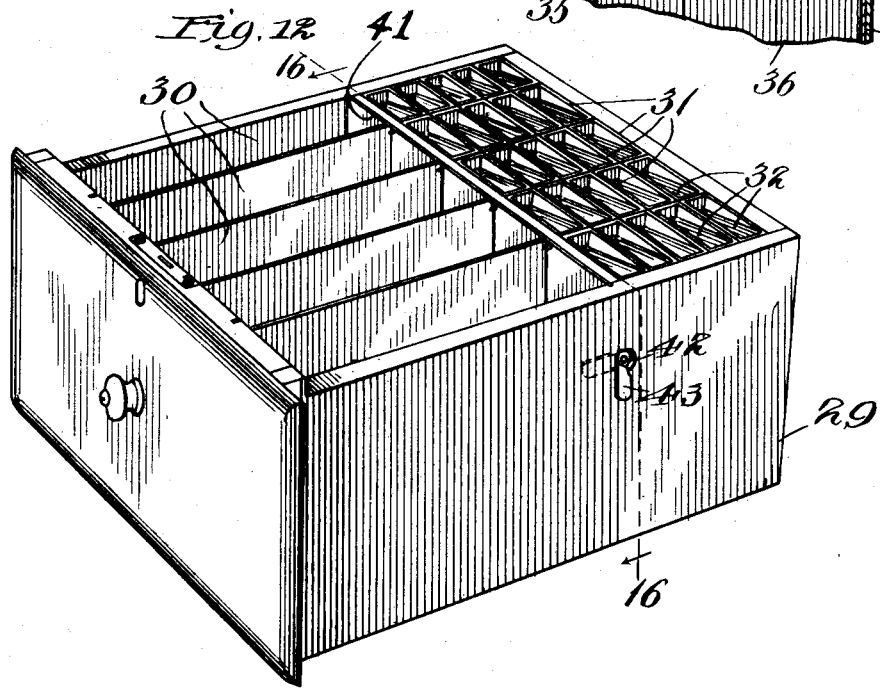
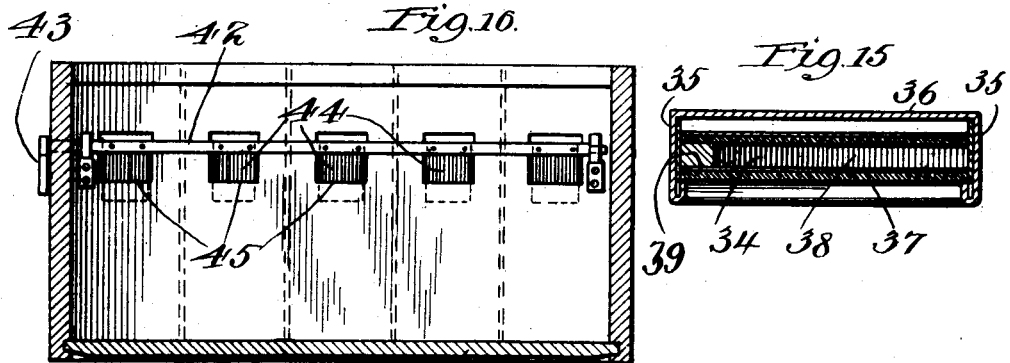
Witnesses
N. C. Corlies
Wm. Geiger
Inventor
John Blocher,
By Walter N. Haskell,
Atty.

No. 684,395. Patented Oct. 8, 1901.
J. BLOCHER.
VOTING MACHINE.
(Application filed July 13, 1900.)
(No Model.) 8 Sheets—Sheet 8.

Witnesses

Inventor
John Blocher.
by Walter N. Haskell.
Atty

UNITED STATES PATENT OFFICE.

JOHN BLOCHER, OF FRANKLIN GROVE, ILLINOIS, ASSIGNOR OF ONE-HALF TO ELMER E. MILLER, OF SAME PLACE.

VOTING-MACHINE.

SPECIFICATION forming part of Letters Patent No. 684,395, dated October 8, 1901.

Application filed July 13, 1900. Serial No. 23,495. (No model.)

*To all whom it may concern:*

Be it known that I, JOHN BLOCHER, a citizen of the United States, residing at Franklin Grove, in the county of Lee and State of Illinois, have invented certain new and useful Improvements in Voting-Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.
My invention relates to voting-machines, and involves a number of improvements over devices of that class now in existence.

I primarily seek to provide a machine wherein the voter can in a secret manner denote his choice of candidates by the deposit of metallic ballots in proper receptacles for such candidates, his use of the machine being so controlled by the mechanism thereof as to prevent his voting for more than one candidate for the same office or casting more than one vote for the same candidate except in cases where it is proper for him so to do.

The method of depositing the ballots in their several receptacles is such that the ballots for each candidate whose name appears upon the ticket are automatically counted as they are deposited, so that when the polls are closed the number of votes cast for any such candidate can be determined at once.
I am aware that voting-machines have been heretofore known providing for the deposit of a metallic ballot; but these machines have been to a certain extent defective and have not fulfilled all the requirements of devices of that kind. Through their use it has been possible to vote only for a candidate whose name appeared upon one of the regular tickets, the voter being barred from casting a vote for an independent candidate or casting a vote on the minority-representation plan, as provided for by the laws of some of the States. I remedy this defect and provide a means whereby the voter can cast an independent ballot or can distribute his vote among minority-representation candidates, the casting of his ballot for an independent candidate precluding him from voting for any other candidate for the same office, and the number of votes cast by him under the minority-representation law being limited by the machine to the number that he is entitled to cast under the statute.

Figures 17, 18:
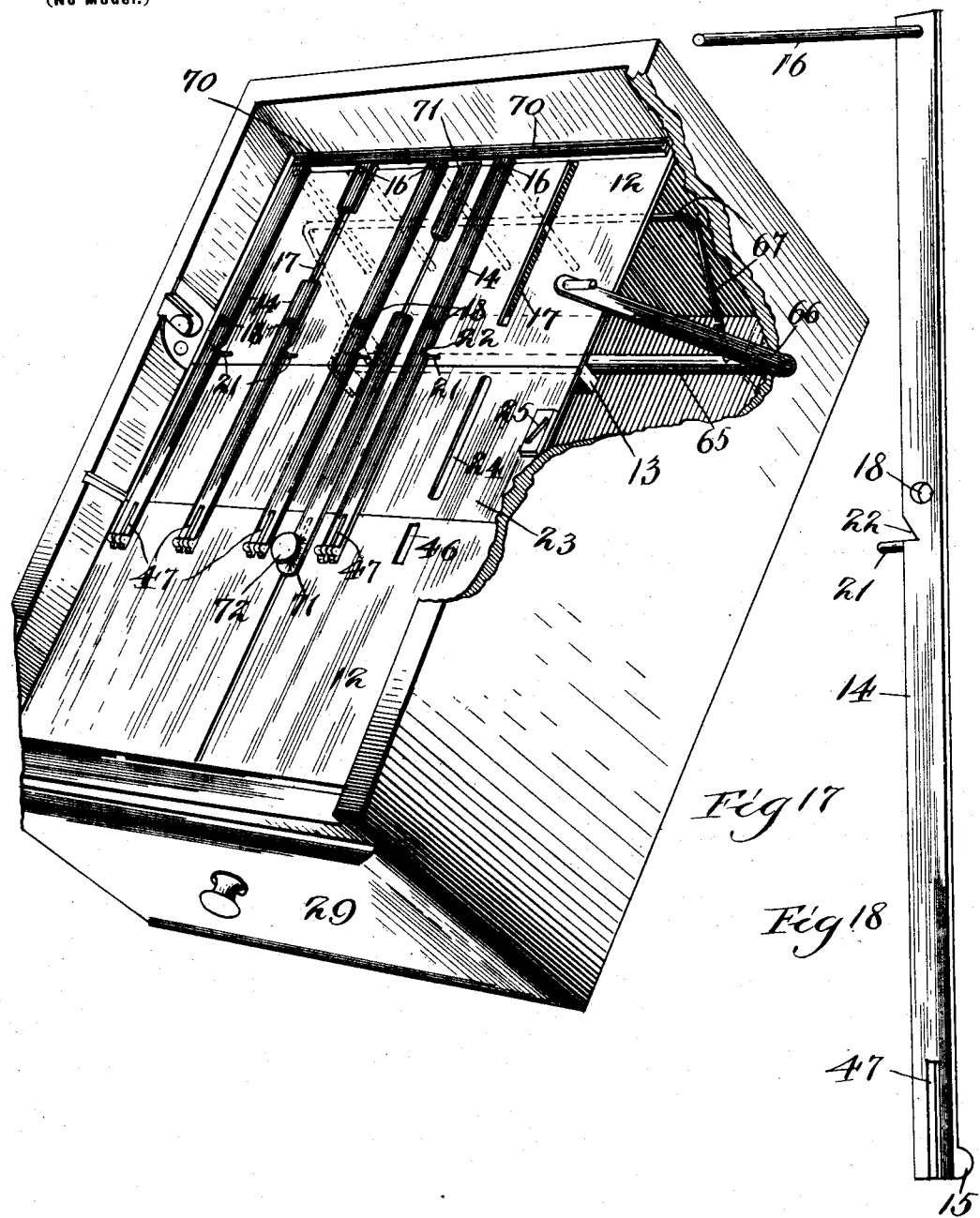

In the drawings, Figure 1 is a view of my device in perspective with the lid thereof open. Fig. 2 is a similar view with the lid closed. Fig. 3 is a detailed plan view of the voting mechanism with certain parts thereof broken away. Fig. 4 is a detailed vertical section on the line 4 4 of Fig. 3. Fig. 5 is a detailed vertical section on the line 5 5 of Fig. 3. Fig. 6 is a vertical section on the line 6 6 of Fig. 3. Fig. 7 is a detailed cross-section on the broken line 7 7 of Fig. 5, showing one of the ballot-receptacles and mechanism controlling the passage of the ballot thereto. Fig. 8 is a detailed plan view of the device in the ballot-compartment 4 for agitating the ballots and means for operating the same. Fig. 9 is a partial section in the line 9 9 of Fig. 8. Fig. 10 is a detailed front elevation of one of the ballot-receptacles. Fig. 11 shows the bottom of the ballot-receptacle in front and side elevation in dotted lines. Fig. 12 is a view of the ballot-drawer in perspective. Fig. 13 is a plan view showing the top of the ballot-receptacle. Fig. 14 is a cross-section in the line 14 14 of Fig. 13. Fig. 15 is a cross-section in the line 15 15 of Fig. 14. Fig. 16 is a rear elevation of the main partition of the ballot-drawer. Fig. 17 is a view in perspective of the ballot-slides and mechanism in the rear part of the machine controlling the same. Fig. 18 is a perspective showing the lower side of one of the slides 14.

Similar characters refer to similar parts throughout the drawings.

1 is the ballot-box, the rear part of which is provided with a cover 2 and the front part thereof with a movable lid 3. Just beneath the cover 2 is a compartment 4, having a floor 5 inclined slightly downward in the direction of the front end of the machine. This compartment serves as a receptacle for the ballots before they are used in the operation of voting. The ballots used in my device consist of small metallic balls 6 of uniform diameter, the requisite number thereof being placed in the compartment 4 when it is desired to use the machine for an election.

The lower end of the floor 5 is divided by partitions 7 into any desired number of spaces, each space representing some one of the offices to be voted for and holding temporarily the ballots intended to be used in connection with such office. Each space is provided with an agitator 8, pivoted as at *a* and having a pin 9 on the lower side thereof, Figs. 8 and 9. Between the movable end of each agitator 8 and the next adjacent partition 7 is a narrow space a little greater in width than the diameter of one of the balls 6, in which space is a loading-chamber 10, extending through the floor 5 and adapted to receive several of the balls 6. Secured to the partition 7 just above the agitators 8 is a cross-plate 11 to prevent the balls 6 from getting in the rear of such agitators and interfering with their operation.

Extending throughout the length of the box 1 is a raised floor 12, supported by crosspieces 13. A series of slides 14 extends longitudinally of the floor 12, there being one of such slides for each office to be filled. The slides 14 are provided at their forward ends with ribs 15 and at their rear ends with downwardly-projecting fingers or keys 16, passing through slots 17 in the floor 12. Each slide 14 is further provided with a perforation 18, of suitable dimensions to receive one and one only of the balls 6, there being one perforation 18 to correspond with one each of the loading-chambers 10, such perforation being longitudinally in line with such chamber and adapted to receive one of the balls 6 therefrom when the slide 14 is at or near the end of its inner movement. The front ends of the slides 14 are secured from lateral movement by means of the cross-piece 19, provided with recesses 20. The slides 14 are further provided on one side with spurs 21 and angular recesses 22, adapted to engage the pins 9 on the agitators 8 and give to the free ends of such agitators a limited reciprocating movement, as hereinafter set forth.

The central portion of the floor 12 consists of a movable section or ballot-plate 23, provided with longitudinal ballot-slots 24, and having at one side the diagonal slot 25. The slots 24 correspond in number with the slides 14 and perforations 18, each slot 24 being normally slightly out of line with its corresponding perforation, as shown in Fig. 7. Just above the ballot-plate 23 is a stationary ticket-plate 26, having thereon the names of all the candidates who have been regularly nominated by one or more parties arranged in columns with the name of the office to be filled at the head of the column, all the names of candidates of the same political party being in line across the ticket. At the side of each column of names is a slot 27, such slots being severally in line with the center line of the slides 14, and consequently with the perforations 18, the contents of such perforations being visible through such slots during the greater part of the movement of the slides 14.

Over the ticket-plate 26 is secured a transparent glass plate 28, permitting a view of such ticket-plate, but preventing the insertion of anything through the slot 27.

29 is a drawer adapted to be secured in the box 1 beneath the floor 12, the front part of such drawer being divided into a series of compartments 30 and the rear part of said drawer being filled with ballot-receptacles 31, so arranged that there is one of said receptacles beneath each name of a candidate upon the ticket-plate 26. The receptacles can be of any desired depth, the depth of the drawer 29 and box 1 being accommodated thereto. In the upper part of each receptacle 31 is a trough 32, Fig. 13, having at one end an aperture 33 of sufficient size to permit the passage of a ball 6, the trough 32 sloping in the direction of such aperture. Immediately below the trough 32 is a space 34, in width slightly greater than the diameter of one of the ballots 6, such space being inclosed by the side pieces 35 35, a back 36, and a transparent glass front 37. At the lower end of the space 34 is an inclined bottom 38, upon which the balls 36 fall upon entering the space 34, forming thereon in uniform rows and having the same number of balls in each row, the receptacle being so constructed as to accommodate any desired number thereof to the row.

At one side of the space 34, visible through the glass front 37, is a graduated scale 39, indicating the number of balls in the complete rows. Upon the front face of the back 36, also visible from the front, are vertical lines 40, dividing so much of the back 36 as is visible through the front 37 into equal spaces, also provided at the top with a graduated scale, indicating the number of balls in an incomplete row. The receptacles 31 are arranged in columns in the drawer 29, the compartments 30 forming a continuation of such columns, there being one of said compartments for each office to be voted for. The compartments 30 are separated from the receptacle-compartment by a partition 41, to the rear of which is journaled a shaft 42, Fig. 16, operated by a lever 43 and having secured thereto a series of supports 44, extending through corresponding openings 45 in the partition 41, each compartment 30 being provided with one of such supports in a line longitudinally with one of the slides 14, such series of supports 44 being just beneath a series of slots 46 in the floor 12. The front ends of the slides 14 are provided with a corresponding series of slots 47, registering with the slots 46 when the slides 14 are at the end of their inner movement.

48 is a card, Fig. 1, of any suitable material, of slightly less thickness than the slots 46 and 47 and adapted to pass through such slots and rest upon one of the supports 44.

49 is a shaft journaled in the sides of the box 1 near the top thereof, to which shaft is secured the lid 3. The lid 3 is provided with a series of apertures 50, through which can be seen the slots 27 in the ticket-plate when the lid is closed. A series of smaller openings 51, just above the ticket-slots 46 and 47, permit a view thereof when the slides 14 are pushed into the extreme limit. The openings 51 may be covered by a glass plate similar to the plate 28 over the ballot-slots to prevent the insertion of cards when the lid is closed.

On the inside of the box 1, at one side thereof, is a reciprocating slide-bar 53, supported by brackets 54. Secured to the slide-bar 53 is a forked standard 55, engaged by a projection 56 on the shaft 49 at right angles to the plane of the lid 3. Secured to the front end of the slide-bar 53 is a downwardly-extending support 57, provided with a pin 58, adapted to engage and raise the lever 43 and supports 44. On the upper face of the slide-bar 53 is a pin 59, engaging the slot 25 in the movable part of the floor 12 and imparting lateral movement to such movable section through the reciprocating movement of the bar 53.

60 is a downwardly-extending arm, having its lower end forked to engage a pin 61 on a reciprocating hammer 62, hinged, as at b, and adapted to strike alternately upon two gongs 63 and 64, said gongs having tones of varying pitch.

65 is a shaft journaled to the sides of the box 1, operated by the lever 66, secured to the end thereof on the outside of the box. A loop 67, of wire or other suitable material, is rigidly secured to the shaft 65 and is adapted to engage the keys 16 on that side thereof nearest the front end of the ballot-box. A projection 68, secured to the shaft 65, striking upon the block 69, limits the forward movement of the loop 67. At the rear ends of slides 14 is a cross-bar 70, operated by the draw-bar 71, extending to the front of the machine and provided with a knob or handle 72. Lateral movement of the front part of the draw-bar 71 is prevented by its passage through a recess 73 in the cross-piece 19.

For holding elections the box is supported at a suitable height from the floor in a secluded part of the room, being so situated that the rear end of such box is toward that part of the room occupied by the election-board and in plain view thereof. Before any voting is done the compartment 4 is charged with a sufficient number of the balls 6 for the purposes of the election to be held. The lever 65 is then thrown backward, carrying with it the keys 16 and forcing the slides 14 to the inner end of their movement. The backward movement of the slides 14 causes the spurs 21 to strike the pins 9 on the agitators 8, imparting to the free ends of such agitators a limited backward movement, stirring the balls 6 and causing several of them to roll into each of the loading-chambers 10, if the same are not already filled. The lid is then closed and the machine is ready for use. Each voter separately steps in front of the box and raises the lid 3 to a position slightly beyond the perpendicular, such lid forming a screen between the voter and the election officials or other persons in the room and rendering his actions secret. The secrecy of his ballot is further insured by the fact that the mechanism to be operated by the voter in denoting his choice is depressed below the sides of the box and is not visible at any distance therefrom. The raising of the lid 3 causes the projection 56 to engage the forked standard 55 and move the slide-bar 53 forward, the same operation through the pin 59 and the slot 25 moving the ballot-plate 23 laterally until the ballot-slots 24 are out of line with the perforations 18 in the slides 14. The forward movement of the slide-bar 53 also causes the pin 58 to engage the lever 43 and raise such lever and the card-supports 44 to a horizontal position. The forward movement of said bar also operates the hammer 62, causing the gong 64 to ring, notifying the board of election of the fact that all parts of the machine are in position for voting. If the voter desires to vote a straight party ticket, he pulls the draw-bar 71 toward him by means of the button 72, which action brings all of the ballot-slides 14 forward simultaneously, (the perforations 18 in the ballot-slides 14 each having received a ball 6 from the loading-chambers 10,) presenting to the view of the voter a line of ballots across the ballot-plate, and when this line of ballots reaches the line of the nominees of his party he lets the draw-bar rest. He can now see a ballot in front of a name of each candidate nominated by his party, a ball in front of a name being equivalent to a cross placed in the square in front of a name, as provided by the Australian ballot system. If at this stage he closes the lid 3, he will have voted a straight party ticket, as is usually the case; but should he wish to scratch one or more of the nominees of his party he can quickly do so by pushing back the ballot-slide containing the ball in front of the name of the person he does not wish to vote for to its original position, or should he desire to vote for one or more of the nominees of any of the other parties he can move each ballot-slide to and fro independently until the ball conveyed therein is in front of the desired name on the ballot-plate. If the voter desires to cast a vote for one or more candidates whose names do not appear on the regular ticket, he procures the requisite number of official voting-cards 48 and writes thereon the names of the persons he wishes to vote for, after which he inserts each card in its slot 46 in that one of the slides 14 representing the office he wishes to vote for. This must be done while the slide 14 is at the end of its inner movement, as any disturbance thereof throws the slots 46 and 47 out of register. The card 48 passes through the slots 46 and 47, the lower end thereof resting upon one of the supports 44 and locking the slide 14 from longitudinal movement, the opening of the lid 3, and consequent forward movement of the slide-bar 53, having caused the pin 58 to engage the lever 43 and raise such lever and the supports 44 to a horizontal position, as before set forth. This card feature permits the voter to cast an entire independent ticket and also affords him facilities for casting his vote under the minority-representation law, regardless of the number of votes assigned to each candidate on the printed ballot, as he can write the names of the candidates of his choice and the number of votes he desires to cast for each on one of the official voting-cards and insert it in the slot at the end of the proper ballot-slide. When the voter has denoted his choice of candidates in the manner specified, he closes the lid 3, bringing the ballot-slots 24 again in line with the perforations 18, permitting the ballots 6 to drop through the slots 24 into their several receptacles 31, at the same time dropping the supports 44 and permitting the cards 48, if any have been used, to fall into the proper compartments 30. The closing of the lid 3 also operates the hammer 62, causing the gong 63 to ring, informing the proper officials that his vote has been cast. After closing the lid 3 the voter throws back the lever 66, returning the slides 14 to their original positions, completely destroying the identity of the ballot just cast and preparing the machine for the next voter. Each inner movement of the slides 14 through the agitators 8 stirs the balls 6, prevents their binding or "bridging," and insures a sufficient supply at all times in the loading-chambers 10. The inner movement of the slides 14 carries the perforations 18 beyond the movable section 23, and it is evident that when a card 48 is inserted in the slots 46 and 47, the slide being locked at the limit of its inner movement, it is impossible to cast one of the balls 6 for any candidate for the same office for which the card 48 is voted, and that, *per contra*, when a ballot 6 is opposite the name of a candidate for any office on the ticket the bringing it into such position will have thrown the slots 46 and 47 out of register and prevented the deposit of a card 48 for any candidate for that office. It is also apparent that it is impossible to cast more than one of the ballots 6 for the same office, for while the slides 14 may be moved backward and forward any desired number of times the one ballot will be retained thereby until released by the closing of the lid and the notification thereof by the ringing of the gong. In like manner the card 48 is held in place in the slot 46 until released by the closing of the lid 3, preventing the deposit of more than one card for the same office by the same voter.

The forward movement of the slides 14 is so limited by the loop 67, controlled by the projection 68, that the ballots carried by such slides cannot pass beyond the lowest row of names on the ticket-plate. After the polls are closed the drawer 29 is unlocked and removed, the receptacles 31 lifted out, and the vote determined, as hereinbefore specified. The number of ballots indicated for a minority-representation candidate is multiplied by the number of votes which can be cast for such candidate under the law by one voter. The cards voted in the compartments 30 are counted in the usual manner.

What I claim as my invention, and desire to secure by Letters Patent of the United States, is—

1. In voting-machines, a number of small metallic balls of uniform diameter, serving as ballots; a ballot-box, having a compartment for holding such ballots, such compartment being divided into several spaces, each space corresponding to some one office to be filled by an election; several columns of ballot-receptacles arranged longitudinally of the machine, each column corresponding to some one office to be filled by the election, and the several receptacles in each column corresponding to the several candidates for such office; all the receptacles for the candidates of the same political party being in line transversely of the machine; means for conveying a series of ballots simultaneously from the ballot-compartment to points ready to be deposited, one for each candidate, in any desired row of ballot-receptacles, ready to be voted for a straight ticket; or, independently, to points above the ballot-receptacles, one in each column thereof, representing the candidates of different political parties; means for indicating to the voter for what candidates such ballots will be cast; means for depositing such ballots simultaneously in the several receptacles above which they are located; and means for denoting that they have been so properly cast; substantially as shown, and set forth.

2. In a voting-machine, small metallic balls of uniform size for ballots, a series of columns of ballot-receptacles, a system of ballot-slides for conveying the ballots thereto; a series of card-compartments forming an extension to such columns, and adapted to receive voting-cards through slots provided therefor in the ends of the ballot-slides, a floor just below such slides having card-slots therein corresponding to the slots in the ballot-slides and adapted to normally register with such slots; a series of movable supports in said compartments for holding the cards until the vote is cast, and means for operating such supports; the arrangement of said machine being such that when a card is inserted in the slot at the end of a ballot-slide, such slide is locked in such a position that no ballot can be conveyed to a point above any of the ballot-receptacles in the same column; and that when a ballot is in position to be cast in any receptacle in a column the card-slots in the same column will be out of register, and no card can be inserted therein; substantially as described.

3. In a voting-machine, small metallic ballot-balls of uniform size, a loading-compartment for holding said balls, receptacles for receiving said balls, a reciprocating perforated slide for transferring said ballots from said loading-compartment to said receiving-receptacles, the perforations being so spaced as to deliver the balls to the desired receptacles; a ballot-plate having a ballot-slot normally out of line with the ballot-slide and perforation therein, and adapted when brought in line with such perforation, to permit the passage of a ballot to a point below such ballot-plate; and means for operating said ballot-plate, substantially as set forth.

4. In a voting-machine a number of small metallic balls of uniform diameter representing ballots, a column of receptacles corresponding to a column of names of candidates to be voted for for some one office; a ballot-plate having a ballot-slot immediately above such column of receptacles, and adapted to permit the passage of a ballot to any one of said receptacles; a reciprocating slide; a perforation located in such slide and adapted to convey a ballot from the ballot-compartment to a point just above any of the ballot-receptacles in said column, the ballot-slot being normally out of line with the ballot when in the ballot-conveyer, and supporting such ballot; and means for moving such ballot-slot laterally, so as to permit of the passage of the ballot therethrough; substantially as set forth.

5. In a voting-machine a number of small metallic balls of uniform diameter representing ballots; a ballot-compartment a series of columns of ballot-receptacles, a slide above each of such columns adapted to convey one of such ballots from the ballot-compartment to a point just above any one of the receptacles in such column; a ballot-plate normally interposed between the ballot and ballot-receptacles having a series of ballot-slots and being adapted to move laterally, so as to bring all of said slots simultaneously in line with the ballot-slides, and permit the deposit of a ballot in one receptacle in each column thereof; substantially as shown and described.

6. In a voting-machine, the combination of a number of small metallic balls of uniform diameter, representing ballots; a series of slides for conveying such ballots to their proper receptacles; a cross-bar against which the ends of such slides abut; and means for moving such cross-bar forward, so as to operate all of such slides uniformly and simultaneously, and to convey several ballots to points in a straight line across the ballot-box, in preparation for the casting of a vote for a straight ticket; substantially as set forth and described.

7. In a voting-machine, the combination of the slides 14, having perforations 18; loading-chambers 10; and ballot-plate 23 provided with a ballot-slot 24; and means for operating such ballot-plate, substantially as described.

8. In a voting-machine of the class described, the combination of the slides 14, having perforations 18; loading-chambers 10; the compartment 4; and agitators 8; and means for operating such agitators; substantially as shown and set forth.

9. The combination in a voting-machine of the class named, of the slides 14, ribs 15 at their front ends, downwardly-extending keys 16 at their rear ends; and the loop 67 adapted to engage and force all of said keys and accompanying slides to the end of their inner movement; and also limit the forward movement of such slides; and means for operating such loop: substantially as described.

10. In a voting-machine of the class described the combination of the slide 14, having reciprocating longitudinal movement, and provided with a spur 21; and the agitators 8, provided with a pin 9, adapted to be engaged and operated by such spur 21; substantially as set forth.

11. In a voting-machine using small metallic balls for ballots, a ballot-receptacle having an inclined bottom, and adapted to receive and hold such ballots in a series of uniform rows; such receptacle being provided with a transparent front, and having at one side thereof a graduated scale upon which is indicated the number of ballots in the complete rows; substantially as shown and set forth.

12. In a receptacle for ballots consisting of small metallic balls of uniform diameter, an inclosure adapted to receive and hold such ballots in uniform rows; the front of such inclosure being transparent; and provided with a graduated scale at one side thereof to indicate the number of ballots in the complete rows, and being further provided with vertical lines and a scale to assist in determining the number of ballots in an incomplete row; substantially as shown and described.

13. In a ballot-receptacle for receiving and holding small metallic balls of uniform diameter, the combination of the sides 35; back 36; transparent front 37; the space between said back 36 and front 37 being slightly wider than the diameter of one of said balls; the inclined bottom 38, and the inclined trough 32, forming the top of such receptacle, and provided with the aperture 33 at the lower end thereof; substantially as shown and set forth.

14. In a voting-machine of the class described, the combination of the lid 3, the shaft 49 operated thereby, and the projection 56; the slide-bar 53, forked standard 55, engaged and operated by the projection 56; the pin 59 secured to the slide-bar 53; the ballot-plate 23, provided with ballot-slots 24, and having the diagonal slot 25, engaged by the pin 59; substantially as set forth.

15. In a voting-machine of the class described, the combination of the lid 3; the shaft 49 operated thereby, projection 56; the slide-bar 53, forked standard 55, engaged and operated by the projection 56; the forked arm 60 secured to the slide-bar 53; hammer 62; and gongs 63 and 64; substantially as shown and set forth.

16. In a voting-machine of the class described, the combination of the lid 3; shaft 49 operated thereby, projection 56; the slide-bar 53 the forked standard 55, engaged and operated by the projection 56; the support 57 secured to the slide-bar 53 the pin 58; the lever 43, engaged by the pin 58; shaft 42, operated by the lever 43; the supports 44, secured to the shaft 42, and partition 41, having the openings 45 therein; substantially as shown and described.

In testimony whereof I affix my signature in presence of two witnesses.

JOHN BLOCHER

Witnesses:
STELZER A. DURKES,
GEO. BATES.